Jan. 28, 1964 L. E. ROSEMOND ETAL 3,119,903
COMBINATION EYEGLASS FRAME AND HEARING AID UNIT
Filed Dec. 8, 1955 3 Sheets-Sheet 1
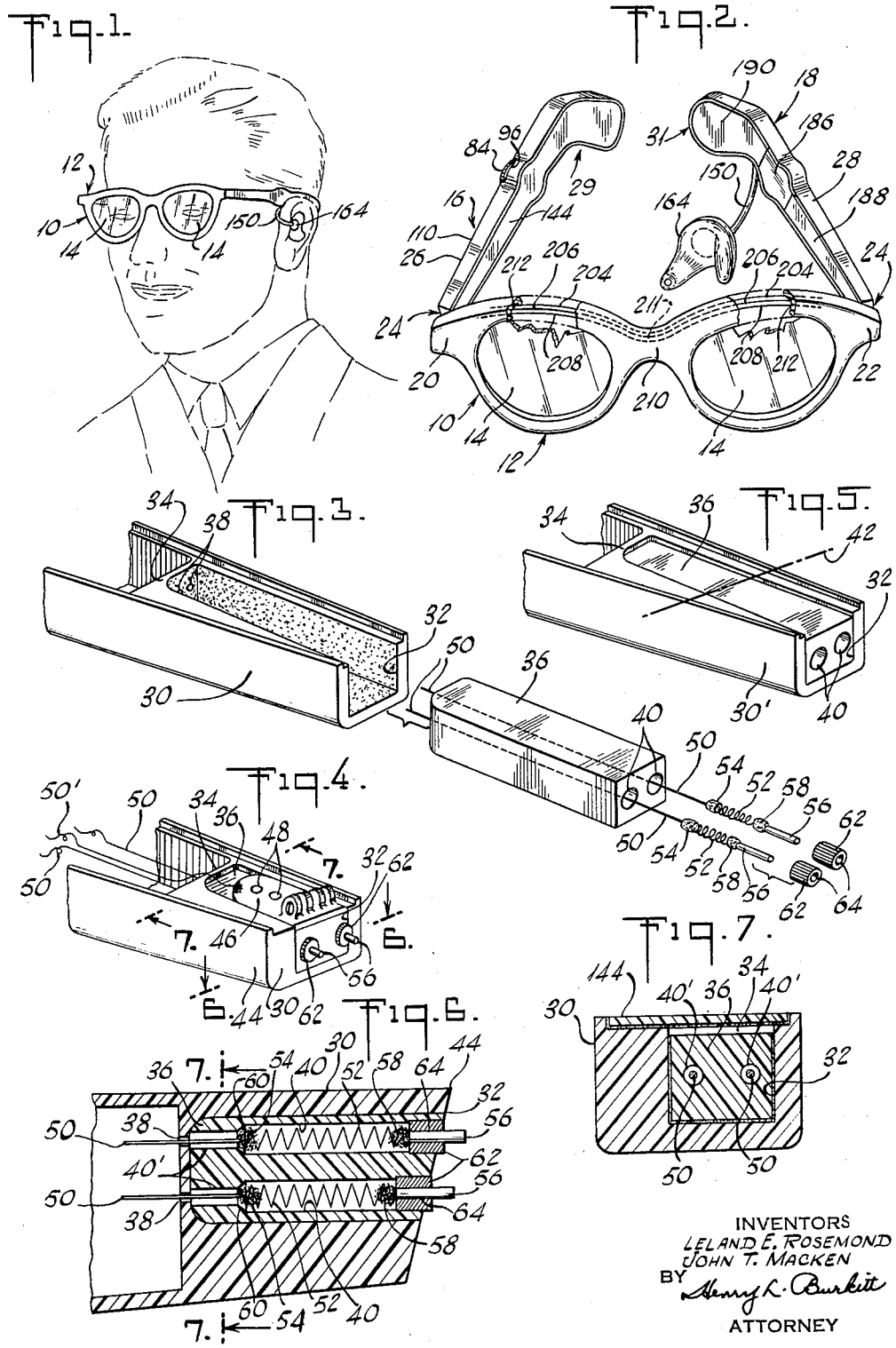
INVENTORS
LELAND E. ROSEMOND
JOHN T. MACKEN
BY
Henry L. Burkitt
ATTORNEY Jan. 28, 1964     L. E. ROSEMOND ETAL     3,119,903
COMBINATION EYEGLASS FRAME AND HEARING AID UNIT
Filed Dec. 8, 1955     3 Sheets-Sheet 2
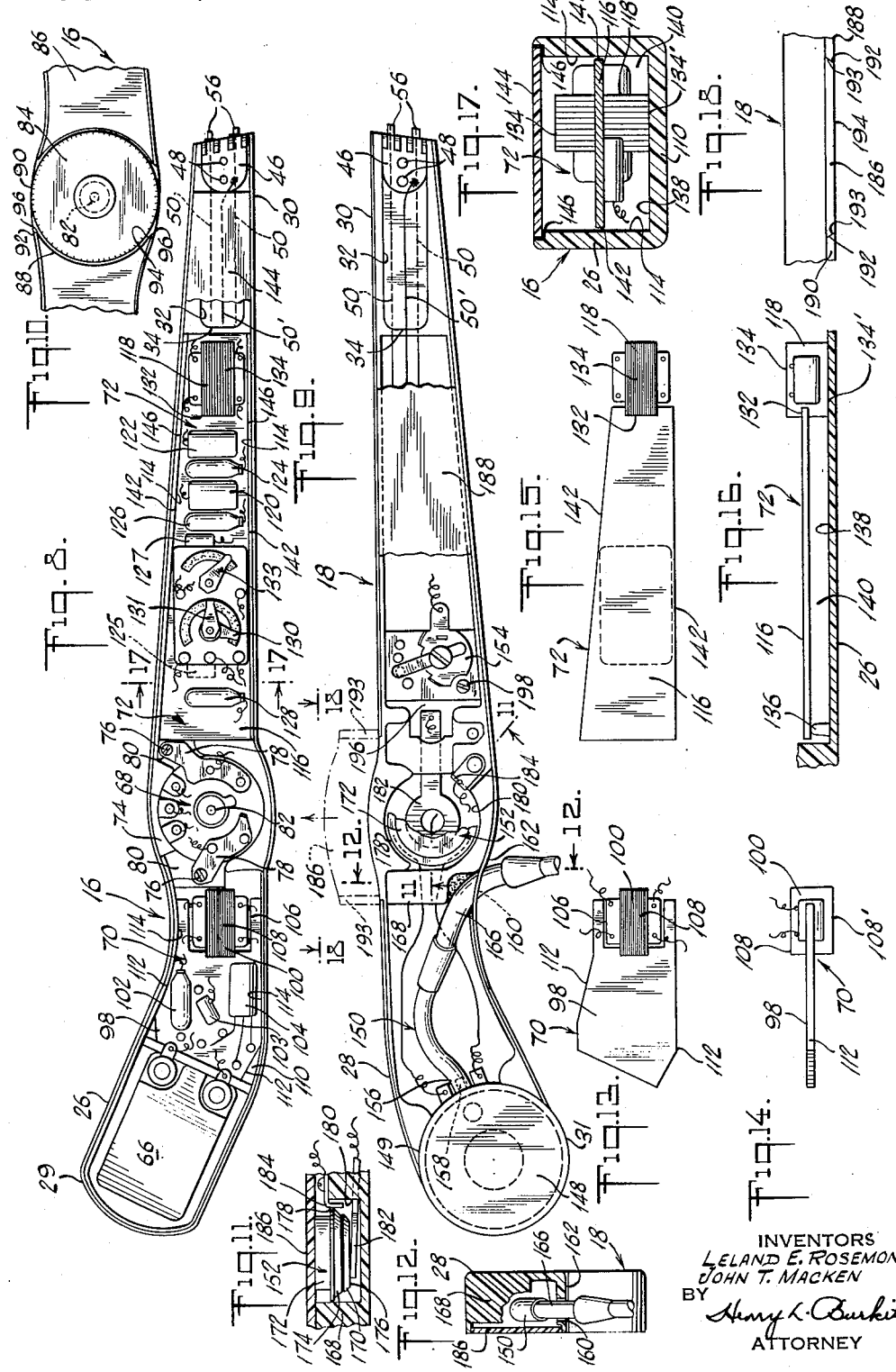
INVENTORS
LELAND E. ROSEMOND
JOHN T. MACKEN
BY
Henry L. Burkitt
ATTORNEY

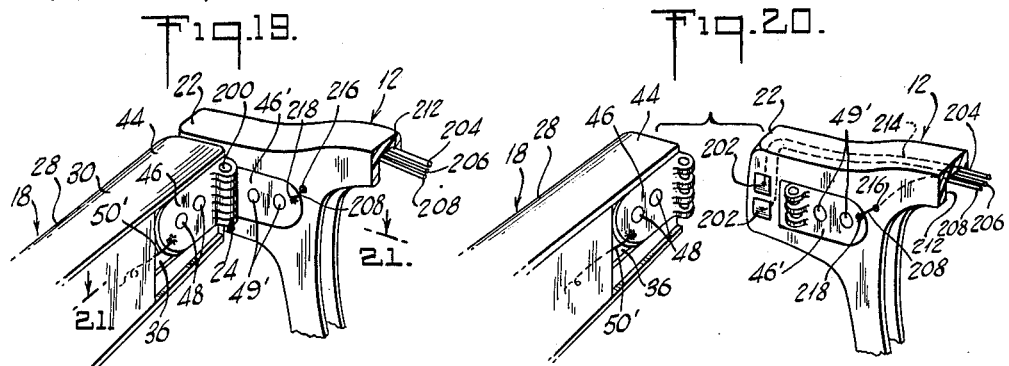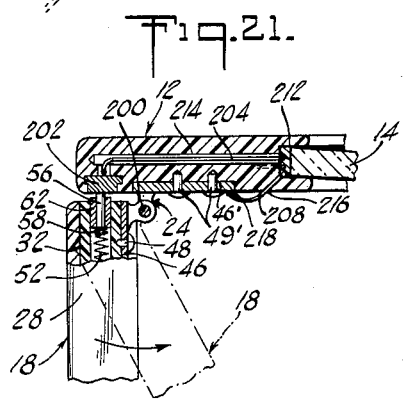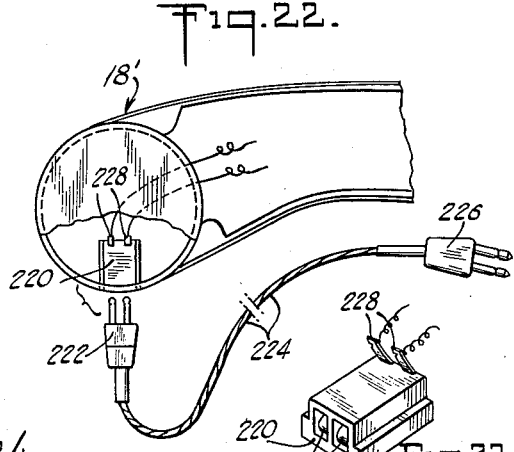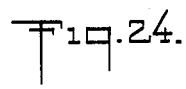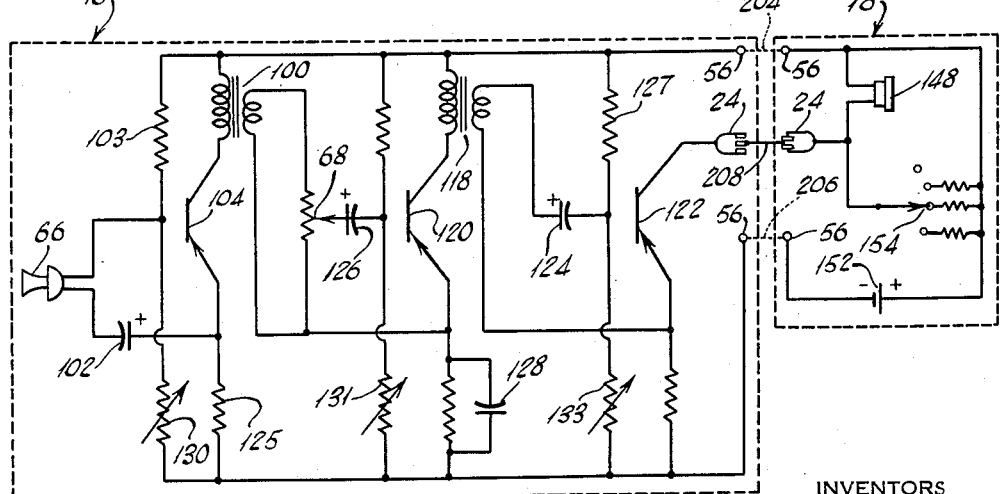
INVENTORS
LELAND E. ROSEMOND
JOHN T. MACKEN
BY
ATTORNEY United States Patent Office 3,119,903
Patented Jan. 28, 1964

3,119,903
COMBINATION EYEGLASS FRAME AND
HEARING AID UNIT
Leland E. Rosemond, Carborough, and John T. Macken, Ossining, N.Y., assignors to Otarion, Inc., New York, N.Y., a corporation of New York
Filed Dec. 8, 1955, Ser. No. 551,830
5 Claims. (Cl. 179—107)

This invention relates to a combination eyeglass frame and hearing aid unit.

An object of the invention is to provide a hearing aid combined with and contained in an eyeglass frame to attain minimum bulk and weight, and yet to be attractive in appearance, and efficient and reliable in operation. As one possible application of the invention, substantially all of the components of the hearing aid, with the exception of an air tube and ear piece, are housed and concealed in the temples of the eyeglasses, and the temples have imparted to them a bent form so that they may be worn properly and in the usual manner, but without deteriorating the acoustical and electrical properties of the hearing aid.

Another object of the invention is to provide a hearing aid combined with an eyeglass frame with which is associated a volume control for the amplification circuit of the hearing aid, wherein the control is manually adjustable by means of an element accessible at one of the temples as the eyeglasses are worn.

Another object of the invention is to provide an eyeglass structure into which a hearing aid unit is incorporated in the manner indicated, wherein, from temples of standard length, adjustment may be effected to lengths in accordance with the requirements of individual wearers without affecting the electrical and acoustical properties of the hearing aid.

Another object of the invention is to provide means, in conjunction with a combination eyeglass and hearing aid unit, to control the circuit of the hearing aid so that when the eyeglasses are worn, the unfolding of the temples for that purpose will close the hearing aid circuit, and the circuit will be opened when the eyeglasses are removed and the temples are folded from said extended disposition.

Another object of the invention is the provision in a unit in which eyeglasses and hearing aid are combined, of a power source for the hearing aid mounted in one temple of the eyeglasses so that it may readily be removed and replaced, and yet be fully guarded when the unit is in use.

Another object of the invention is to provide in a unitary eyeglass and hearing aid combination, a receiver and associated air tube arrangement in one temple of the eyeglasses positioned to locate the air tube in the region of the ear of the wearer with which that temple is associated.

Another object of the invention is to provide a unitary eyeglass and hearing aid combination wherein separable and separate subassemblies are disposed in the temples in such manner as to become substantially self-locating and supporting.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the Statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is a view in perspective showing a unitary eyeglass and hearing aid combination embodying features of the invention and in position on a wearer;

FIG. 2 is a perspective view of a unitary eyeglass and hearing aid combination, arts being broken away to clarify structural details;

FIG. 3 is a fragmentary perspective exploded view of details of the construction of a temple for the combination, parts thereof being shown displaced from their assembled relation;

FIG. 4 is a fragmentary perspective view of the hinged end of a temple after it has been made up to a predetermined length and then finished;

FIG. 5 is a fragmentary perspective view of a portion of the hinged temple end when some of the parts shown in FIG. 3 have been assembled to permit sizing the temple to a predetermined length;

FIG. 6 is a substantially horizontal cross-sectional view, to enlarged scale, as seen from the line 6—6 of FIG. 4;

FIG. 7 is a vertical cross-sectional view substantially on the line 7—7 of FIG. 6, and to enlarged scale;

FIG. 8 is a side elevational view of one of the temples, the internal arrangement of the parts being shown disclosed by breaking the cover plate away;

FIG. 9 is a view of the other temple shown in a manner similar to FIG. 8;

FIG. 10 is a fragmentary side elevational view of the temple of FIG. 8 to illustrate the manner of association of the manual control for the volume control;

FIG. 11 is a detail cross-sectional view, substantially on the line 11—11 of FIG. 9, to illustrate the battery-retaining and effective-making means;

FIG. 12 is a detail cross-sectional view, substantially on the line 12—12 of FIG. 9, to illustrate the manner in which the air tube is retained in the temple;

FIG. 13 is a plan view of one of the hearing aid subassemblies, certain of the parts being removed in order to simplify the illustration thereof;

FIG. 14 is a side elevational view of the subassembly shown in FIG. 13;

FIG. 15 is a view similar to FIG. 13 of another of the subassemblies;

FIG. 16 is a side elevational view of the subassembly shown in FIG. 15, as that subassembly appears when mounted in a temple;

FIG. 17 is a cross-sectional view on the line 17—17 of FIG. 8, to an enlarged scale;

FIG. 18 is a detail elevational view of a portion of the temple and the battery chamber cover as seen from the plane of the line 18—18 of FIG. 9;

FIG. 19 is a fragmentary perspective view showing portions of a temple and of the eyeglass frame as they cooperate at the hinged connection between temple and frame;

FIG. 20 is an exploded view of the assembled parts of FIG. 19, the parts being shown separated from their hinging relation;

FIG. 21 is a detail cross-sectional view of the construction of FIG. 19, as seen from line 21—21 of FIG. 19;

FIG. 22 is a fragmentary side elevational view of the end portion of a temple and associated parts entering into a modified construction of combined eyeglasses and hearing aid;

FIG. 23 is a perspective view of a socket which may be utilized in the embodiment of FIG. 22; and FIG. 24 is a wiring diagram for a hearing aid unit of the type herein considered.

Referring to the drawings in detail, there is shown, in FIGS. 1 and 2, a pair of eyeglasses 10 which may comprise a frame 12 which mounts lenses 14. A pair of temples 16 and 18 are associated with the respective end portions 20 and 22 of frame 12 by means of hinges 24. Eyeglasses 10 are constructed to house and support a hearing aid unit; for this purpose, temples 16 and 18 may take the form of hollow housings or casings 26 and 28, respectively, within which hearing aid components are disposed in the manner to be described.

The temples have structural similarities, but are different in the respects to be noted. The temples may be produced by molding plastic into the desired shape. At the respective ends 29 and 31 of the temples 16 and 18, they are bowed inwardly, and downwardly (FIGS. 1, 2, 8 and 9), as shown, to conform to the head contouring of the wearer. In addition, these temples must be adjusted to the length desired properly to permit their assembly on the heads of various users. Each temple (FIGS. 3–7) may have a body end part 30, here shown as tapering. End part 30 may be provided with an open-ended socket 32 which terminates at a transverse partition 34, the socket being of substantially uniform depth and width. In the socket is adapted to be received a plug member 36. Plug member 36 is seated and adhesively secured in socket 32 to produce the intermediate assembly 30′ (FIG. 5). Extending through partition 34 are wiring apertures 38 which register with companion passages 40 provided in plug member 36. The assembly 30′ may be cut down, by any suitable tool, to a desired length dictated by that required by a user. For example, assembly 30′ may be cut along a line 42 (FIG. 5) to provide a finished end part 44 of a desired length. To end part 44, thus adjusted to a desired length, a hinge plate 46 is secured by suitable fastener elements such as rivets 48. Plate 46 is attached to the cut-off portion of plug member 36 so that the end edge of plate 46 is flush with the end face of plug member 36.

Through passages 40 and apertures 38 are threaded wires 50. To the end of each wire is soldered an end of a compression spring 52, as indicated at 54. The other end of each said spring is soldered to a pin member 56 to provide a ball of solder 58. Each passage 40 terminates in a reduced bore 40′, thus defining a shoulder 60 at the inner end of passage 40 against which shoulder will bear soldered end 54 of that associated spring 52. Into the other end of passage 40 is pressed a bushing 62 having a serrated exterior surface for that purpose. Pin member 56 extends through the bore 64 of the bushing, being limited by ball 58 against the action of spring 52 (FIGS. 4 and 6). The hearing aid circuit to be described requires three conductors. Two of these conductors are comprised by wires 50 which are electrically connected to pin members 56. A third wire 50′ is soldered to hinge plate 46.

In temple 16 (FIG. 8) is mounted a microphone 66, a gain or volume control 68, and subassemblies 70 and 72. Volume control 68, which may be of the rotating finger, potentiometer type, is disposed in an intermediate cell 74 provided in temple 16 which is slightly widened at that position to receive the control. The body of the control may be retained against rotating relatively to the temple by means of screws 76 which engage mounting flanges 78 of the control to surfaces 80 on the temple at opposite sides of the volume control. The volume control includes a central spindle 82 the end of which extends through an opening in the wall of the temple to have secured thereto, at the outside face of the temple, a manually operable control wheel 84 (FIG. 10). Wheel 84 is disposed in a recess 88 in the outer face 86 of the temple so that the wheel is flush with that outer face. The peripheral surface 90 of wheel 84 is serrated for ease of manual rotation, and is made accessible by cutting away the walls of recess 88 at its upper and lower edges 92 and 94, respectively, to provide openings 96, whereby the control wheel may be engaged by the finger of the wearer and be rotated readily to control the amplification gain of the hearing aid.

Subassembly 70 may include a mounting plate 98, which may be formed from plastic or any other suitable material. A transformer 100, a condenser 102, a resistance 103, and a transistor 104 may be mounted upon plate 98. The transformer may be secured to the plate, as, for instance, by adhesive, the transformer being associated snugly in an opening 106 at one end of the plate so that the latter is disposed intermediately of and in substantially parallel relation to the opposite faces 108 and 108′ of the transformer. In FIGS. 13 and 14, only the association of transformer 100 with mounting plate 98 is shown for simplicity in illustration; it is to be understood that the plate also supports other components of the hearing aid circuit. Subassembly 70 is supported in position by the bearing of face 108′ of transformer 100 upon the inner face of wall 110 of temple 16 so that the plate is spaced from wall 110 to provide space between the latter and the mounting plate for passage of wiring and positioning of circuit components such as the condenser and the transistor. The side edges 112 of plate 98 engage the side walls 114 of temple 16 snugly and lock the subassembly in place.

Subassembly 72 generally is similar to subassembly 70 in its functional relationship to temple 16. Subassembly 72 may comprise a mounting plate 116 (FIGS. 8, 15, 16 and 17) of material similar to mounting plate 98; with plate 116 are assembled a transformer 118, transistors 120 and 122, condensers 124, 126, and 128, resistances 125 and 127, and trimmer controls 130, 121 and 133. Transformer 118 may be assembled in an opening 132 at one end of plate 116 in a manner similar to the assembly of transformer 100, so that plate 116 is disposed intermediately of and in substantially parallel relation with opposed faces 134 and 134′ of the transformer.

Subassembly 72 is supported in position in temple 16 by transformer 118 at one end, and by resting on a projection 136 at its other end, the face 134′ of the transformer resting upon inner face 138 of wall 110. Projection or support 136 may be formed integrally with wall 110. By supporting plate 116 in this manner, there is defined a space 140 for receiving wiring and circuit components. Edges 142 of plate 116 fit snugly between walls 114 of temple 16 to lock subassembly 72 in position within the temple. The side of temple 16 opposite wall 110, left open in the molding operation, may be closed by a cover member 144 which interfits with and is adhesively secured to a peripheral shoulder 146 formed in the molding of the temple, the cover member extending to adjacent hinge plate 46.

In temple 18 (FIG. 9) is mounted a receiver 148. Leading from the sound producing elements within the casing defining receiver 148 is an air tube 150. Temple 18 also houses a battery 152, and a power control 154, in the receiver circuit, to control the maximum power deliverable to the receiver from the amplification circuit. Receiver 148 may be secured adhesively in position at the free end of the temple 18 along the line in a slight depression 149, formed in the temple for that purpose. The inner end 156 of air tube 150 may be connected to a fitting 158 on the receiver properly to receive and conduct the sounds developed by the receiver. Air tube 150 (FIGS. 9 and 12) may be made up of a plurality of suitably interconnected lengths or sections of small bore plastic tubing. Tube 150 may extend from the receiver within the temple, to and through an aperture 160 in a side wall 162 at a position on that wall adjacent the wearer's ear. The tube terminates in an ear piece 164 shaped to fit and lock in the ear canal (FIGS. 1 and 2). Ear piece 164 thus is disposed for positioning in the wearer's ear with a minimum air tube length and with minimum disclosure of the air tube. Air tube section 166 is relatively rigid, and is held in position by being adhesively secured to a face of a cut-out in partition 168.

Battery 152 (FIGS. 9 and 11) may be of conventional construction. It may be comprised of a pair of shells 170 and 172 secured together with an insulating member 174 disposed therebetween. Face 176 of shell 170 may form one electrical contact, while the peripheral edge 178 of shell 172 forms the other electrical contact. The battery is removably mounted in a recess 180 defined in the temple housing for that purpose. A spring contact plate 182 may be retained at the bottom of recess 180; a contact 184 may be held in a fixed position adjacent the peripheral wall of recess 180. Contacts 182 and 184 engage with face 176 and edge 178, respectively, of the battery to place the latter in circuit with the hearing aid components.

In order to provide for ready removability of the battery, a cover plate 186 (FIGS. 2, 9 and 18) may be mounted to slide relatively to cover members 188 and 190 assembled at opposite sides of recess 180 in the same manner as cover member 144. Members 188 and 190 are undercut, as at 192, to provide clearance for the sliding movement of cover 186. The opposite edges 193 of plate 186 are convergingly inclined toward outer face 194 of cover 186 to interfit with undercut edges 192, to retain plate 186 in position.

Power control 154 is secured in position adjacent partition wall 196 of the temple by suitable means, such as a screw 198 received in an adjacent thickened portion of the temple housing (FIG. 9).

A hinge plate 46' (FIGS. 19–21) is secured to each of end portions 20 and 22 of frame 12 by suitable means such as rivets 49'. Hinge plates 46' are interlocked with and pinned to companion hinge plates 46 of the respective temples by screws 200 which then provide pivots for movement of the temples with relation to the frame. Frame 12 is structurally similar at end portions 20 and 22, each of which is provided with a pair of spaced contacts 202. These contacts may be secured in position by any suitable means, as, for instance, by heat sealing them in position to engage related pin members 56 of the temples in their unfolded or extended positions. Folding of the temples through but a small portion of the movement to folded relation breaks the circuit through pin members 56 and contacts 202. Members 56 normally, by reason of the action of the associated springs 52, are biased into engagement with contacts 202 when the temples are extended.

Extending along frame 12 are wires 204, 206 and 208 which electrically interconnect the circuit components of the hearing aid housed in the temples. Bridge piece 210 has a passage 211 drilled therethrough for the extension therethrough of wires 204, 206 and 208 which extend along grooves 212 in which the lenses seat. The wires are secured adhesively in the bottoms of the grooves adjacent the edges of lenses 14. Each of end portions 20 and 22 has passages 214 extending from grooves 212 for the reception of wires 204 and 206, the latter being electrically connected to contacts 202. Wire 208 extends through a passage 216 which extends from groove 212, and terminates adjacent hinge plate 46'; that wire is soldered directly to hinge plate 46', as indicated at 218.

Thus, each of wires 204 and 206 connects a companion pair of contacts 202 at the opposite end portions 20 and 22 of frame 12, while wire 208 connects hinge plates 46' at the opposite end portions. Wires 204 and 206 are in circuit with companion wires 50, respectively, when the temples are in their extended position; wire 208 is in circuit at all times with its companion wire 50' in each temple through hinges 24.

FIG. 24 illustrates a wiring diagram for the hearing aid circuit. The amplifier components of this circuit may be disposed in either temple; in the structure here disclosed, they are disposed in temple 16, while the receiver components are disposed in temple 18. It will be observed that, in the three-wire circuit of the hearing aid, one wire is connected directly through hinges 24 and that circuit is closed at all times; the circuits for the other two wires, through spring pin members 56, are closed only when both temples are unfolded and are in the extended disposition. Power control 154 of the receiver is of the four-position type, with one position an "off" or open circuit position. Trimmer controls 130, 131 and 133 are three manually adjustable resistors. The circuit integration of the various components of the hearing aid circuit are clearly indicated on the circuit diagram.

In FIGS. 22 and 23, there is shown a modified temple 18' which may have an association like temple 18 except that no receiver 148 is housed in the temple. In this case, a socket member 220 may be secured in position adhesively and be disposed so that the socket member may have a plug 222 detachably connected to it. That plug 222 may be carried by an external receiver cord 224 at the other end of which is another plug 226 adapted to be plugged into an external receiver to be positioned directly in the ear in the usual manner of hearing aids. Thus the contacts 228 of socket 220 may be connected in the circuit provided for receiver 148, and then a suitable external receiver is coupled to the circuit of the temple by the plug connections of cord 224.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. Combination eyeglasses and hearing aid, comprising a frame part having a pair of temples pivotally connected thereto at the opposite ends thereof, hearing aid components disposed in said temples, said components comprising a microphone in one temple and a receiver in the other temple, and electronic amplifying means in said temples, electrical conducting means extending longitudinally of said frame part for electrically connecting in circuit said hearing aid components in said temples, and means for connecting said hearing aid components of each of said temples in circuit with said conducting means for putting the amplifying means in circuit through said hearing aid components only by moving the temples and the frame part into position for wearing one of said temples having a recess disposed therein for the reception of a battery constituting the power supply for the hearing aid, and means providing for the ready removability of said battery from said recess comprising a cover member slidably movable at the inner face of said one temple from a recess covered disposition to a recess uncovered disposition, the battery being removable from said recess in said uncovered disposition of said cover member.

2. Combination eyeglasses and hearing aid, comprising a frame part having a pair of temples pivotally connected thereto at the opposite ends thereof, each of said temples having hearing aid components disposed therein and interconnected in circuit relation, electrical conducting means extending longitudinally of said frame part for electrically connecting in circuit said hearing aid components of each of said temples, and means for connecting said hearing aid components of each of said temples in circuit with said conducting means to complete a circuit through said hearing aid components, one of said temples comprising a casing provided with a longitudinal recess having a bottom wall, a subassembly disposed in said recess and comprising a mounting plate having a plurality of said hearing aid components supported thereby, one of said last mentioned components being constituted by a transformer secured to one end of said mounting plate with a part thereof extending laterally below said mounting plate, said part engaging said bottom wall, whereby to space said mounting plate therefrom to provide space between said bottom wall and said mounting plate for the disposition of wiring and other hearing aid components therein.

3. Combination eyeglasses and hearing aid, comprising a frame part having a pair of temples pivotally connected thereto at the opposite ends thereof, each of said temples having hearing aid components disposed therein and interconnected in circuit relation, electrical conducting means extending longitudinally of said frame part for electrically connecting in circuit said hearing aid components of each of said temples, and means for connecting said hearing aid components of each of said temples in circuit with said conducting means to complete a circuit through said hearing aid components, one of said temples comprising a casing provided with a longitudinal recess having a bottom wall, a subassembly disposed in said recess and comprising a mounting plate having a plurality of said hearing aid components supported thereby, one of said last mentioned components being constituted by a transformer secured to one end of said mounting plate with a part thereof extending laterally below said mounting plate and engaging said bottom wall, and means disposed in fixed relation with said casing for supporting the opposite end of said mounting plate, said last mentioned means and said transformer part being jointly operable to space said mounting plate from said bottom wall to provide for the disposition of wiring and other circuit components in said space.

4. Combination eyeglasses and hearing aid, comprising a frame part having a pair of temples pivotally connected thereto at the opposite ends thereof, each of said temples having hearing aid components disposed therein and interconnected in circuit relation, electrical conducting means extending longitudinally of said frame part for electrically connecting in circuit said hearing aid components of each of said temples, and means for connecting said hearing aid components of each of said temples in circuit with said conducting means to complete a circuit through said hearing aid components, one of said temples comprising a hollow longitudinally extending casing terminating in an ear support piece having a receiver secured thereto, said casing having an aperture in the bottom wall thereof adjacent said ear support piece, and an air tube secured at one end to said receiver internally of said casing with the opposite end thereof being adapted for connection to an ear piece, said air tube having a section extending internally of said casing and a section extending externally thereof through said bottom wall aperture, said casing further having a recess forwardly of said ear support piece for the reception of a battery constituting the power supply for the hearing aid, and said hearing aid components in said one temple comprising a power control for controlling the maximum power deliverable to said receiver.

5. A spectacle hearing aid device comprising an ophthalmic member and a temple member pivotally attached on each side thereof, each temple member comprising a shell-like body defining compartment means for the reception of hearing aid circuitry, a battery compartment formed in said body and a battery disposed therein, said body having an opening at one side of said battery compartment, cover members secured to said shell-like body enclosing said compartment means and having end portions at opposite sides of said opening, a cover having rail members extending behind said end portions of the cover members and slidably disposed at said opening to extend across said battery compartment, and abutment means formed on said shell-like body engaging said slidable cover and operative to limit movement thereof.

References Cited in the file of this patent
UNITED STATES PATENTS

| | | |
|---|---|---|
| 2,207,705 | Cox | July 16, 1940 |
| 2,327,320 | Shapiro | Aug. 17, 1943 |
| 2,443,249 | Jackson | June 15, 1948 |
| 2,444,302 | Lybarger | June 29, 1948 |
| 2,482,288 | Posen | Sept. 20, 1949 |
| 2,500,301 | Tresise et al. | Mar. 14, 1950 |
| 2,613,282 | Scaife | Oct. 7, 1952 |
| 2,650,267 | Walters | Aug. 25, 1953 |
| 2,659,270 | Hurst | Nov. 17, 1953 |
| 2,765,373 | Smith | Oct. 2, 1956 |
| 2,794,085 | De Angelis | May 28, 1957 |
| 2,797,617 | Ring | July 2, 1957 |
| 2,830,132 | Borg | Apr. 8, 1958 |
| 2,915,598 | Brunton | Dec. 1, 1959 |
| 2,930,857 | Hollingsworth | Mar. 29, 1960 |
| 3,035,127 | Strzalkwoski | May 15, 1962 |

FOREIGN PATENTS

| | | |
|---|---|---|
| 491,677 | Great Britain | Sept. 7, 1938 |
| 840,622 | France | Apr. 28, 1939 |
| 679,303 | Great Britain | Sept. 17, 1952 |
| 526,640 | Belgium | Mar. 15, 1954 |
| 723,981 | Great Britain | Feb. 16, 1955 |
| 737,115 | Great Britain | June 27, 1955 |
| 1,098,731 | France | Aug. 18, 1955 |